United States Patent [19]

Chesnut

[11] 4,187,752

[45] Feb. 12, 1980

[54] ROTARY DIE LOCK STRUCTURE

[75] Inventor: W. Richard Chesnut, West Caldwell, N.J.

[73] Assignee: W. R. Chesnut Engineering, Inc., Fairfield, N.J.

[21] Appl. No.: 860,691

[22] Filed: Dec. 15, 1977

[51] Int. Cl.$^2$ .............................................. B23D 25/12

[52] U.S. Cl. .......................................... 83/663; 83/698; 29/118

[58] Field of Search ................. 83/659, 698, 663, 665, 83/669, 673, 674; 29/118, 129.5; 101/415.1

[56] References Cited

U.S. PATENT DOCUMENTS

| | | | |
|---|---|---|---|
| 1,545,791 | 7/1925 | Owen | 101/415.1 |
| 1,579,182 | 3/1926 | Thayer | 29/118 X |
| 1,582,390 | 4/1926 | Evans | 101/415.1 |
| 1,827,300 | 10/1931 | Pritchard et al. | 101/415.1 |
| 1,927,728 | 9/1933 | Wolff | 101/415.1 X |
| 2,121,309 | 6/1938 | Wale | 101/415.1 X |
| 3,043,219 | 7/1962 | Dietrich | 101/415.1 X |
| 3,578,761 | 5/1971 | Sarka | 83/665 X |
| 3,893,394 | 7/1975 | Fusco et al. | 101/415.1 |

*Primary Examiner*—J. M. Meister
*Attorney, Agent, or Firm*—Carella, Bain, Gilfillan & Rhodes

[57] ABSTRACT

A rotary die is disclosed to include a roller having a transversely extending channel with bores formed therein, a die sheet wrapped around the roller and having a pair of its edges extending into the channel, the die sheet having shoulders formed on its edges, and locking means disposed within the channel and cooperating with the shoulders on the die sheet to cause tightening of the die sheet around the surface of the roller in response to the tightening of the locking means through the use of bolts securing the locking means to the tapped bores formed in the transverse channel.

3 Claims, 7 Drawing Figures

ROTARY DIE LOCK STRUCTURE

BACKGROUND OF THE INVENTION

This invention relates to die cutting apparatus. More specifically, this invention relates to apparatus for locking a die sheet to be in surface-to-surface contact with a die roller to provide true cylindrical presentation of the die sheet.

This invention also incorporates a novel bridge means for providing a continuous die cutting surface even in the area of the die sheet locking means.

Equipment for cutting and scoring continuous webs of material such as paper, sheet metal, cardboard and the like is relatively high speed, sensitive equipment. Broadly speaking such equipment falls into two general categories, reciprocating equipment and rolling equipment. Reciprocating equipment utilizes an upper die and a lower die of flat construction which are brough together by apparatus such as stamping presses or the like to make an impression on the material being formed. Where the material being formed is a continuous web there also are required equipment such as accumulators so as to permit continuous operation of other portions of the line, e.g. printing stations and the like, without causing interruption in the production line velocity. Rolling equipment utilizes a pair of cylindrical die rollers. The material being worked is passed therebetween and the cooperating rollers cut or score the material.

Those having skill in these arts will recognize that utilization of reciprocating equipment presents serious disadvantages. Interrupted advancement of the workpiece web causes tensile stresses which sometimes cause tearing or rupture of the material. Additionally, continued web advancement in other areas of the production line require the use of accumulators in conjunction with the die cutting apparatus. Further, use of reciprocating equipment with respect to work requiring continuing die cut registry presents difficult alignment problems.

Rotary die cutting equipment, of course, is much better able to handle die cutting for continuously advancing work products. Where, however the cut repeat is not consistent with the circumference of the die roller, problems have arisen both with respect to registry and with respect to the bridge between the die surfaces in the area of the die securing structure. More specifically, known methods of securing die sheets to die rollers have included structure which result in a gap between the transverse edges of the die sheet. Where attempts have been made to close the gap between the transverse edges of the die sheet, it has been found to be difficult to effect continuing registry of the die sheet on consecutive rotations.

A still further problem presented by rotary die structure such as those presently known is the difficulty attendant to obtaining a solid surface-to-surface contact between the die sheet and the die roller. Failure to obtain this surface-to-surface contact results in a non-cylindrical surface presentation and a non-solid backing for the die thereby diminishing the cutting efficiency of the die surface.

Although those dealing in these arts have addressed themselves to these problems for a number of years, no satisfactory solutions have been proposed.

SUMMARY OF THE INVENTION

It is an object of the present invention, therefore, to provide a locking means for a die sheet of a rotary die cutter which stretches the die sheet into surface-to-surface contact with the die roller of the cutting apparatus.

A further object of the present invention is to provide a locking means for a die sheet of a rotary die cutter wherein die sheet registry is easily obtainable.

Still a further object of the present invention is to provide a locking means adapted to accommodate securing a bridge device for achieving continuous cutting capability of the die roller.

Yet another object of the present invention is to provide a locking means for die rollers which is simple in construction, efficient in operation and which permits adjustment for die sheet registry.

An additional object of the present invention is to provide a locking means wherein a bridge element may be utilized to permit continuing workpiece cutting in continuing registry.

These objects and others not enumerated are achieved by the locking structure of the present invention, one embodiment of which may include a die roll having a transverse channel formed therein, a die sheet disposed around the die roll and having edges extending into the transverse channel, the edges having shoulders formed thereon, and locking elements cooperating with the shoulders formed on the die sheet to draw the die sheets tightly into surface-to-surface contact with the surface of the die roll.

The present invention also contemplates a locking structure wherein there may be incorporated a bridge means for permitting continuity of die structure without gapping in the area of the locking structure.

BRIEF DESCRIPTION OF THE DRAWINGS

A more complete understanding of the present invention may be had from the following detailed description, particularly when read in the light of the accompanying drawings, wherein.

DETAILED DESCRIPTION

As noted above this invention relates to die cutting apparatus. In particular this invention relates to locking structure for securing die sheets to die rollers and to provide bridge dies for permitting die rollers having continuous, uninterrupted cutting, notwithstanding gaps between the ends of the primary die sheet.

Figure 1:
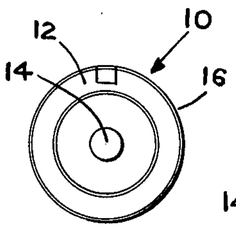
FIG. 1 is an end elevational view of a die roller incorporating a die sheet having locking structure in accordance with the present invention.
Figure 2:
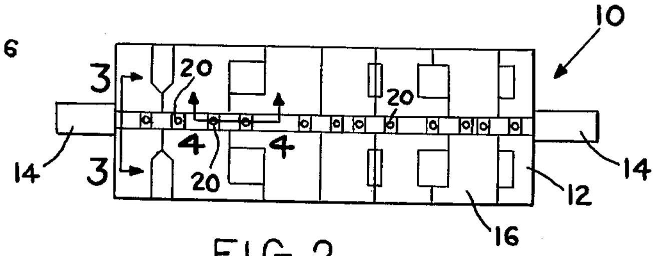
FIG. 2 is a plan view of a die roller incorporating a die sheet having locking structure in accordance with the present invention.

Referring therefore to FIGS. 1 and 2, a die bed die roller according to the present invention is shown a die cutting structure having a locking structure according to the invention, which die structure is designated generally by reference numeral 10.

Die structure 10 includes a roller 12 having a shaft 14 extending beyond each end of the roller for mounting within appropriate bearing supports (not shown). As is discussed below in detail, there is wrapped around the circumferential surface of roller 12 a die sheet 16. Die sheet 16 may be a sheet of thin steel or the like which has been etched to define on its surface a plurality of cutting lands. As will be recognized by those skilled in these arts the lands on die sheet 16 are positioned to cooperate with a plurality of complementary lands on a second die sheet which is mounted on an adjacent roller. Thus, a workpiece is passed therebetween and the complementary lands cut or score a desired pattern in the workpiece.

It is often the case that a desired cutting pattern requires cutting throughout the entire circumferential surface. The locking structure according to the present invention provides bridge structure at the die sheet termination which provides an effective full cutting without interruption for die sheet edge terminations.

Referring to FIG. 2, die sheet 16 is shown together with the locking structure according to the present invention. There are shown a plurality of locking structures each designated generally by the reference numeral 20 and each incorporating the bridge structure feature of the present invention.

Figure 3:
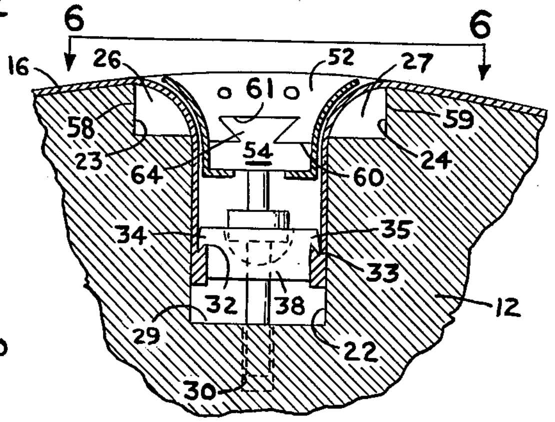
FIG. 3 is a partial cross-sectional elevational view of locking structure according to the invention as seen through the plane 3—3 of FIG. 2.

The specifics of the locking structure according to the invention best may be seen with reference to FIGS. 3 through 6. Referring initially to FIG. 3 there is shown in partial cross-sectional elevational detail the locking and bridge structure 20 mounted on roller 12 to secure die sheet 16 firmly against the circumferential surface of die roller 12. Thus there can be seen to be formed in die roller 12 a transversely extending channel 22. Channel 22 is generally rectangular in cross-section and extends across the entire width of roller 12 (FIG. 2).

Formed adjacent the upper edges of channel 22 are a pair of opposed channels 23 and 24. Channels 23 and 24 also extend the full width of die roller 12 and are adapted to receive therein fillet members 26, 27. As will be recognized by those having skill in these arts, the provision of such channels and the use of fillet elements is an accepted method of providing a radius surface for structure such as the channel 22 in roller 12.

Formed in the base surface 29 of transverse channel 22 are a plurality of tapped bores 30. Tapped bores 30 are positioned in constant spaced centers across the entire width of die roller 12. As is discussed below in detail the spacing of bores 30 corresponds to the spacing of bores formed in locking plates 38 which are received within channel 22.

The termination edges of die sheet 16 are provided with shoulders 32, 33 which may be formed by known techniques such as undercut etching, machining or the like. Shoulders 32, 33 extend the entire width of die sheet 16 and cooperate with complementary shoulders 34, 35 which are formed on the outer surfaces of a locking plate 38.

Figure 5:
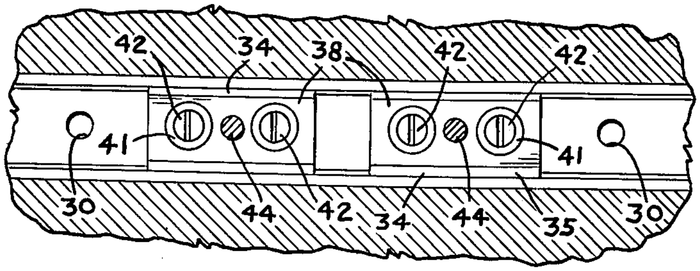
FIG. 5 is a partial cross-sectional path view of locking structure according to the invention as seen through the plane 5—5 of FIG. 4.

As best may be seen in FIGS. 3 and 5, locking plates 38 are generally rectangular members. As noted above, each plate has shoulders 34 and 35 formed thereon along opposed vertical edges. Further each plate is provided with through bores. The end through bores 40 accommodate the passage therethrough of machine screws 42 which are threadedly receivable in bores 30 formed in base 29 of channel 22.

The central bore 44 formed in each locking plate 38 is a tapped bore and accommodates the threaded reception therein of machine screw 46 which is utilized as part of the bridge support locking structure as is discussed below in detail.

Considering initially the utilization of the locking plates 38 without addition of the bridge structure die sheet 16 is wrapped loosely around the circumferential surface of die roller 12 such that its termination ends with shoulders 32 and 33 thereon extend within transverse channel 22. With the die sheet so positioned, a plurality of locking plates 38 are inserted into channel 22 such as to cause the engagement of their shoulders 34, 35 with the shoulders 32, 33 respectively of die sheet 16. With the locking plates so positioned, machine screws 42 are inserted through bores 40 and threaded into tapped bores 30. In this regard the insertion and alignment of the machine screws 42 is facilitated by providing a rounded counterbore 41 at the upper edge of each throughbore 40. After all the machine screws 42 are tightened to hand tight they are progressively tightened by suitable wrench or screwdriver to cause the locking plates 38 and therewith the termination edges of die sheet 16 to be drawn downwardly within channel 22. The drawing of the termination edges of die sheet 16 downwardly into channel 22 stretches die sheet 16 into firm surface-to-surface contact with the surface of roller 16 thus providing a firm uniform cylindrical support for the die sheet.

It further should be noted that prior to final tightening of machine screws 42, the lands on adjacent ends of the die sheet 16 may be aligned by suitable transverse displacement. The mode of checking alignment may be by opitcal viewscope or by some other suitable means chosen from among the many generally known in the art. After alignment the locking plates 38 may be firmly secured.

Figure 4:
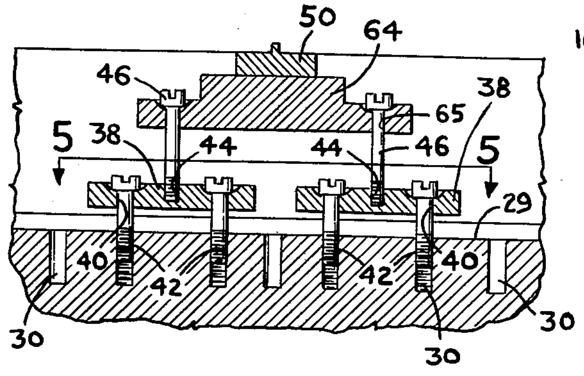
FIG. 4 is a partial cross-sectional elevational view of locking structure according to the invention as seen through the plane 4—4 of FIG. 2.
Figure 6:
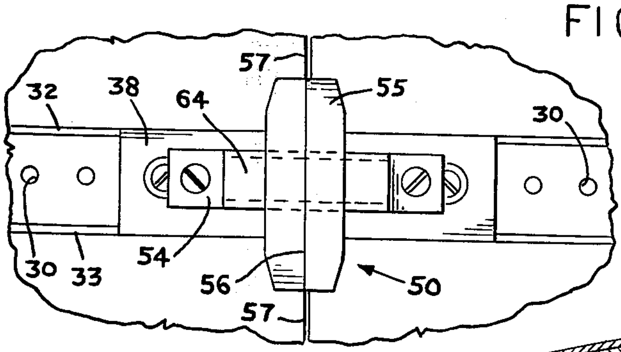
FIG. 6 is a partial plan view of locking structure and bridge structure according to the invention as seen through the plane 6—6 of FIG. 3.

With die sheet 16 firmly secured on roller 12 and with the respective lands being in correct alignment the bridging element 50 may be positioned and secured in operating position. Referring therefore to FIGS. 3, 4 and 6, bridge element 50 can be seen to comprise a die member 52 and a securing member 54. Die member 52 includes an upper curved surface 55. The curvature of which is equal to the curvature of the major external surface to die sheet 16. Formed on upper curved surface 55 is a land or cutting edge 56. Land 56 corresponds in size to a land 57 formed on the main portion of die sheet 16 and cooperates therewith to provide a continuous cutting edge.

Die member 52 includes opposed end surfaces 58, 59 which are shaped to be received in surface-to-surface engagement with the surface of opposed channels 23 and 24 respectively. Thus, the die members rest on channels 23 and 24 and bridge the gap defined by channel 22. Further, the die members are spaced apart by fillet members 26 and 27. The bottom surface 60 of die member 52 is relieved to define a channel 61 having a trapezoidal cross-sectional configuration.

Securing member 54 is a generally rectangular member having upwardly extending flange 64 formed to extend upwardly from its upper surface. Flange 64 is trapezoidal in cross-sectional configuration and corresponds in dimension and shape to be slidably received, in sliding surface-to-surface contact, within channel 61 in die member 52. Formed in the end portions of securing member 54 are radially extending through bores 65. The upper edges of through bores 65 are relieved to define curvilinear surfaces to permit easy alignment of securing member 54 over locking plate 38. Positioned through bores 65 in securing member 54 are machine screws 46 which are threaded into tapped bores 44 in locking plates 38.

Considering therefore the assembly of bridge element 50, it is first necessary to cut die sheet 16 adjacent lands 57 to accommodate the assembly of bridge element 50. This, of course, is done prior to assembly of die sheet 16 on die roller 12. Thereafter, die sheet 16 is positioned on the die roller, and with the terminal ends of land 57 in alignment, the die sheet is secured in place through the use of the locking structure 20 as discussed above.

Bridge element 50 is then positioned generally in place and machine screws 46 are inserted through bores 65 in securing member 54 and threaded into tapped bores 44 until finger tight. Thereafter land 56 is aligned with land 57 by appropriate sliding along shoulder 64, and when in proper alignment the die member 52 is secured in position by securely tightening machine screws 66. This procedure is repeated for however many additional bridge elements may be required by the die design. With the die roller fully assembled the structure is ready for assembly into a die cutting machine.

Figure 7:
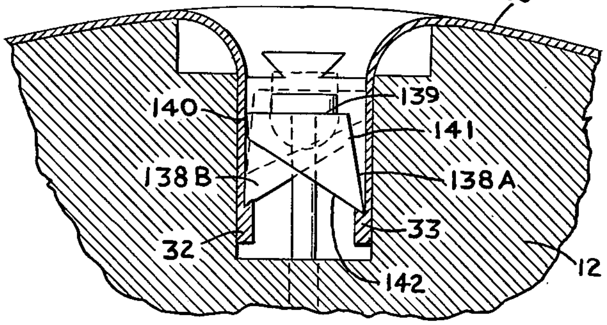
FIG. 7 is a partial cross-sectional elevational view of a modified embodiment of locing structure according to the invention, the view being similar to the view of FIG. 3.

Referring now to FIG. 7, there is shown a die sheet locking structure according to the invention which is identical in all respects to the structure of FIG. 2 except for the configuration of locking plates 38. Thus, in FIG. 7 there is shown in channel 22 a pair of locking plates 138 in use to secure die sheet 16 in place.

Locking plates 138 are identical in all respects however they are installed in opposite facing positions. Thus referring to the locking plates as 138A for the nearest and 138B for the one behind, locking plate 138A includes a top surface 139, a short side surface 140 adapted to engage the surface of die sheet 16 in surface-to-surface relationship, a long side surface 141 which engages shoulder 33 of sheet 16 at its bottom edge and which thereabove tapers slightly away from the surface of sheet 16 and bottom surface 142 which extends between the lower edge of surface 141 and the lower edge of surface 140.

Locking plate 138B is identical to 138A but its position is reversed so that the lower edges of surface 141 engages shoulder 32 of sheet 16.

In the same manner as discussed above with respect to locking plates 38, throughbores are provided through which to receive machine screws for securing the locking plates within channel 22.

The structures of locking plate 138 may be utilized when it is desirable not only to lock the die sheet 16 but also to selectively tension the die sheet at selected transverse points accross channel 22. Thus a locking plate may be positioned anywhere within channel 22 to selectively tension either end of die sheet 16 merely by locating the locking plate as desired and causing the lower edge of surface 141 to engage shoulder 32 or shoulder 33 depending upon what manner of tensioning is desired. By selectively positioning the locking plates, the die sheet may be engaged and selectively gripped at each land. The advantages of this capability will be immediately evident to those having skills in these arts.

Apart from the die sheet manufacture as discussed above, the various elements of the structure of the present invention may be manufactured through the use of conventional manufacturing techniques. Further, the materials for the respective structures may be selected from any of the many known for use in such apparatus.

It should also be noted that the die sheet locking structure according to the present invention permits locking to be achieved in a relatively narrow channel, i.e. a channel which heed be no more in width than 5% of the total circumference of the die roll. As will be recognized by those skilled in these arts this is a significant advantage.

It will be quickly recognized by those skilled in these arts that the locking and bridging structure of the present invention is simple in design, economical and capable of achieving accurate registry and secure locking. It will also be recognized that many modifications and variations to the preferred embodiment may be made without departing from the spirit and the scope of the invention.

What is claimed is:

1. Die sheet locking structure for die roller assembly comprising:

a die roller having a circumferential surface;

a transverse channel formed in said die roller, said transverse channel having a base surface and a plurality of tapped bores formed in said base surface;

a die sheet disposed around said circumferential surface of said die roller, said die sheet having transversely extending terminal edges, said terminal edges having shoulder means formed thereon, and said die sheet further being provided with at least one land disposed around the circumferential surface thereof;

locking means disposed in said transverse channel, said locking means including at least one locking plate having a shoulder thereon, said shoulder on said locking plate for engaging at least one of said shoulders on said terminal edges of said die sheet;

means for drawing said locking plate toward said base surface of said transverse channel with said at least one shoulder of said locking plate in engagement with said at least one of said shoulders of said die sheet, said drawing of said locking plate for causing stretching of said die sheet into surface-to-surface engagement with said circumferential surface of said die roller;

a bridge element for causing a continuation of said land across said transverse channel, said bridge element including a die member and a land means; and means for securing said bridge element to said locking plate of said locking means.

2. Structure according to claim 9 wherein said bridge element includes a securing member, said die member and said securing member being slidably engaged through a dove tail flange and channel, and wherein said means for securing said bridge element to said locking plate includes means for rigidly connecting said securing means to said locking plate.

3. Structure according to claim 2 wherein each said locking plate includes a tapped throughbore, said securing means includes a throughbore, and said means for securing said bridge element to said locking plate includes a machine screw extending through said throughbore in said securing means and threadedly engaging said tapped bore in said locking plate.

* * * * *